United States Patent [19]
Takeda et al.

[11] Patent Number: 5,200,371
[45] Date of Patent: Apr. 6, 1993

[54] METHOD FOR PREPARING ORGANIC SILAZANE POLYMERS AND METHOD FOR PREPARING CERAMICS FROM THE POLYMERS

[75] Inventors: Yoshihumi Takeda, Jouetsu; Akira Hayashida, Higashimurayama, both of Japan

[73] Assignee: Shin-Etsu Chemical Co., Ltd., Tokyo, Japan

[21] Appl. No.: 631,272

[22] Filed: Dec. 20, 1990

[30] Foreign Application Priority Data

Dec. 20, 1989 [JP] Japan .................................. 1-330109

[51] Int. Cl.$^5$ .............................................. C04B 35/02
[52] U.S. Cl. ........................................ 501/95; 528/33; 528/34; 528/38; 525/474; 501/92
[58] Field of Search ....................... 528/33, 38, 34; 525/474; 501/92, 95

[56] References Cited

U.S. PATENT DOCUMENTS

| | | | |
|---|---|---|---|
| 3,853,567 | 12/1974 | Verbeek | 106/44 |
| 4,097,294 | 6/1978 | Rice et al. | 106/43 |
| 4,312,970 | 1/1982 | Gaul, Jr. | 526/279 |
| 4,395,460 | 7/1983 | Gaul | 428/408 |
| 4,404,153 | 9/1983 | Gaul, Jr. | 264/29.2 |
| 4,482,669 | 11/1984 | Seyforth et al. | 524/442 |
| 4,482,689 | 11/1984 | Haluska | 528/25 |
| 4,535,007 | 8/1985 | Cammadu | 427/226 |
| 4,540,803 | 9/1985 | Cannady | 556/412 |
| 4,595,775 | 6/1986 | Arkles | 556/409 |
| 4,847,345 | 7/1989 | Takamizawa et al. | 528/34 |
| 4,975,512 | 12/1990 | Funayama et al. | 525/474 |
| 5,041,515 | 8/1991 | Takeda et al. | 328/34 |

OTHER PUBLICATIONS

Andrianov, et al J. Organometal schem, 3(1965)129-127

"Reactions of Organocyclosilazanes w. Electrophilic and Nucleophilic Reagents".

Zhdanov, et al, Polymer Science USSR vol. 23, No. 6, pp. 1429-1438, 1981, "Catalytic polycondensation of Organosilazanes" (exact date unavailable).

Andrianov, et al, M. V. Lomonosov Moscow Institute of Fine Chemical Technology, "Reaction of α, ω-Dihydromethylsilazanes with Nucleophilic Reagents" oklady Akademii Nauk SSSR, vol. 176, No. 1, pp. 85-88, 1967.

Andrianov, M. V. Lomonosov Moscow Inst. of fine Chem. Techn. "Synthesis of Isotropically Substituted Organosilazanes and some Features of Their Spectra" Zhurnal Obshcheimii, vol. 49, No. 12, pp. 2683-2689, Dec., 1979.

V. V. Kazakova, et al "Chemical Properties of Organooligocyclosilazanes and the Synthesis of Polymers on their Basis" Polymer Science USSR vol. 26, No. 8, pp. 1889-1897, 1984.

*Primary Examiner*—Melvyn I. Marquis
*Attorney, Agent, or Firm*—McAulay Fisher Nissen Goldberg & Kiel

[57] ABSTRACT

Organic silazane polymers are prepared by reacting a specific organic silicon compound or a mixture of organic silicon compounds with a disilazane at a temperature of 25° to 350° C. in an anhydrous atmosphere. The polymers are then reacted with ammonia, thereby reducing the residual halogen in the polymers. The resulting organic silazane polymers are resistant against hydrolysis and stable and thus suitable as precursors for manufacturing ceramic fibers and sheets by shaping, infusibilizing and firing.

1 Claim, No Drawings

METHOD FOR PREPARING ORGANIC SILAZANE POLYMERS AND METHOD FOR PREPARING CERAMICS FROM THE POLYMERS

This invention relates to a method for preparing organic silazane polymers which are stable against heating and hydrolysis and suitable as precursors for ceramic materials. It also relates to a method for preparing ceramic materials from the organic silazane polymers.

BACKGROUND OF THE INVENTION

Great attention has been paid to ceramic materials for their heat resistance, wear resistance, high-temperature strength and other advantages. However, ceramic materials are extremely difficult to mechanically work since they are hard and brittle. Thus most ceramic articles are prepared by sintering and precursor methods. In the sintering method, a ceramic material in powder form is pressed or otherwise molded into a desired shape and then fired for sintering. The precursor method is by melting an organic polymer as a ceramic precursor or dissolving it in a suitable solvent, molding the melt or solution into a desired shape, and then firing for converting the polymer into inorganic form. The precursor method is characterized by the potential manufacture of ceramic articles to a configuration which cannot be achieved with the powder sintering method, and especially adapted for the manufacture of fibers.

Among ceramics, SiC and $Si_3N_4$ are of great interest for high-temperature performance, more particularly because of heat resistance and high-temperature strength for the former and thermal shock resistance and fracture toughness for the latter. Extensive research works have been made on their precursors. The silicon carbide and nitride ceramic materials are also considered useful as reinforcements for fiber-reinforced composite materials by taking advantage of their light weight, heat resistance, and high strength features. Thus integration of these reinforcements with plastics, metals and ceramics is also an important subject.

The inventors previously proposed a process for manufacturing organic silazane polymers in U.S. Pat. No. 4,847,345. This method is successful in the commercial manufacture of organic silazane polymers which have a constant degree of polymerization, moldability, process ability, high strength, flexibility and ease of handling, can be effectively infusibilized and converted into ceramic material in high yields, and are thus useful as ceramic fiber precursors. Using the silazane polymers, high quality ceramic materials composed of SiC and $Si_3N_4$ can be manufactured in high ceramic yields. There can be manufactured ceramic fibers and sheets having improved strength and modulus of elasticity.

Continuing investigations, however, the inventors have found that the organic silazane polymers prepared by the previously proposed method have the following problems.

(1) They are relatively unstable against heating and gradually increase their viscosity upon long.term heating during melt spinning. The melt becomes thermally less stable and less spinnable so that frequent breakage occurs during spinning.

(2) They are relatively less resistant against hydrolysis. After they are molded into articles as by spinning, the articles are liable to gradual hydrolysis by moisture in the air. Introduction of oxygen in relatively large amounts can cause ceramic articles to lose their quality.

SUMMARY OF THE INVENTION

Therefore, an object of the present invention is to provide a novel and improved method for preparing an organic silazane polymer which has solved the problems associated with the organic silazane polymer proposed in U.S. Pat. No. 4,847,345, that is, has improved thermal stability and hydrolysis resistance, while maintaining the advantages thereof. Another object of the present invention is to provide a method for manufacturing a ceramic material of quality using the polymer as a precursor.

U.S. Pat. No. 4,847,345 claims a process for manufacturing an organic silazane polymer which comprises reacting an organic silicon compound of the following formula (I):

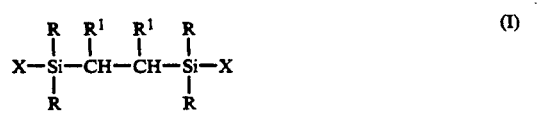

in which R represents hydrogen, chlorine, bromine, methyl radical, ethyl radical, phenyl radical or vinyl radical, $R^1$ represents hydrogen or methyl radical and X represents chlorine or bromine, or a mixture of an organic silicon compound of the formula (I) above and an organic silicon compound of the following formula (II):

in which $R^2$ and $R^3$ represent hydrogen, chlorine, bromine, methyl radical, ethyl radical, phenyl radical or vinyl radical and X represents chlorine or bromine with a disilazane of the following formula (III):

in which $R^4$, $R^5$ and $R^6$ represent hydrogen, methyl radical, ethyl radical, phenyl radical or vinyl radical in an anhydrous state at a temperature of from 25° to 350° C., while distilling off by.produced organic ingredients out of the system to obtain an organic silazane polymer. Making investigations on the resulting organic silazane polymer for the purpose of improving its thermal stability and hydrolysis resistance, the inventors have found that the residual halogen which is normally left in an amount of 0.05 to 3% by weight in the polymer is a major component for adversely affecting the thermal stability and hydrolysis resistance of the polymer.

It should be understood that silazane compounds are inherently susceptible to water so that Si—NH—Si bonds undergo hydrolysis to form Si—O—Si bonds while giving off ammonia. When silazane is formed into fibers, the silazane has a so increased surface area that it is susceptible to hydrolysis by moisture in the air. As a result, ceramic fibers have relatively large amounts of oxygen taken therein and become of poor quality.

The inventors have found that by melting or dissolving in an organic solvent the organic silazane polymer prepared by the above method, blowing ammonia gas into the melt or solution, thereby converting the residual halogen into a salt such as ammonium chloride, removing the salt by filtration, thereby reducing the residual halogen content to 0.01% by weight or lower, there is obtained an organic silazane polymer which is stable against heating during melt spinning or other processing so that it does not increase its viscosity even when heated for a long period of time, ensuring stable melt spinning over a long period of time and which is resistant against hydrolysis. By melting, shaping, infusibilizing, and firing the stable polymer, there can be obtained quality ceramic articles of Si—C—N or Si—C—N—O system which have experienced no buildup of oxygen content and possess improved tensile strength, modulus of elasticity, and high-temperature strength.

According to the present invention, there is provided a method for preparing an organic silazane polymer comprising the steps of: reacting an organic silicon compound of formula (I) or a mixture of an organic silicon compound of formula (I) and an organic silicon compound of formula (II) with a disilazane of formula (III) at a temperature of 25° to 350° C. in an anhydrous atmosphere, and reacting the resulting organic silazane polymer with ammonia, thereby reducing the residual halogen in the polymer.

According to another aspect of the present invention, there is provided a method for manufacturing a ceramic material by melt forming, infusibilizing and firing the above-prepared organic silazane polymer.

DETAILED DESCRIPTION OF THE INVENTION

In the practice of the present invention, an organic silazane polymer having a reduced content of residual halogen is produced by first preparing an organic silazane polymer by the process of U.S. Pat. No. 4,847,345.

That is, an organic silazane polymer is prepared by reacting an organic silicon compound of formula (I):

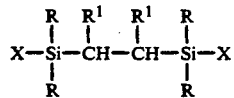
(I)

wherein R is selected from the class consisting of a hydrogen atom, chlorine atom, bromine atom, methyl group, ethyl group, phenyl group, and vinyl group, $R^1$ is a hydrogen atom or methyl group, and X is a chlorine atom or bromine atom, or a mixture of an organic silicon compound of formula (I) and an organic silicon compound of formula (II):

(II)

wherein $R^2$ and $R^3$ are independently selected from the class consisting of a hydrogen atom, chlorine atom, bromine atom, methyl group, ethyl group, phenyl group, and vinyl group, and X is a chlorine atom or bromine atom, with a disilazane of formula (III):

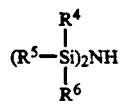
(III)

wherein $R^4$, $R^5$ and $R^6$ are independently selected from the class consisting of a hydrogen atom, methyl group, ethyl group, phenyl group, and vinyl group in an anhydrous atmosphere.

Where the mixture of organic silicon compounds is used, the compounds of formulae (I) and (II) are preferably mixed in a ratio of 50–100 mol % : 50–0 mol %.

Several, non-limiting examples of the organic silicon compound of formula (I) are given below.

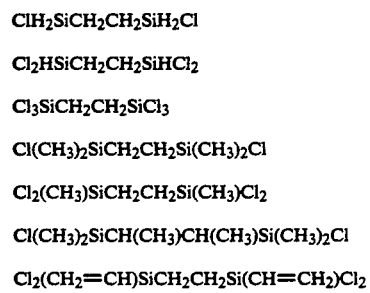

Preferred among these are 1,2-bis(chlorodimethylsilyl)-ethane, 1,2-bis(dichloromethylsilyl)ethane, and 1,2-bis(-trichlorosilyl)ethane.

Several, non-limiting examples of the organic silicon compound of formula (II) include $H_2SiCl_2$, $HSiCl_3$, $SiCl_4$, $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, and $(CH_2=CH)(CH_3)SiCl_2$.

Several, non-limiting examples of the disilazane of formula (III) include $(H_3Si)_2NH$, $[H_2(CH_3)Si]_2NH$, $[H(CH_3)_2Si]_2NH$, $[(CH_3)_3Si]_2NH$, $[(C_2H_5)_3Si]_2NH$, $[(C_6H_5)_3Si]_2NH$, $[(C_6H_5)_3Si]_2NH$, $[CH_2=CH(CH_3)_3Si]_2NH$, $[CH_2=CH(C_6H_5)_2Si]_2NH$, and $[CH_2=CH(C_2H_5)_2Si]_2NH$, and mixtures thereof.

In reacting the organic silicon compound or mixture thereof with the disilazane of formula (III), the amount of disilazane of formula (III) used is theoretically at least ½ mol relative to the halogen content of the organic silicon compounds of formulae (I) and (II). In practice, the amount of disilazane of formula (III) used may be 0.7 to 1.2 times, more preferably 0.8 to 1.1 times on molar basis relative to the halogen content of the organic silicon compounds of formulae (I) and (II).

In the practice of the present invention, the organic silicon compound of formula (I) or mixture of compounds of formulae (I) and (II) is reacted with the disilazane of formula (III) in an anhydrous atmosphere at a temperature of 25° to 350° C. while volatile by.products are removed from the reaction system by distillation. Reaction under such conditions yields the end silazane polymer in any desired form varying from oil to solid form. The organic silicon compounds and the disilazane may be dissolved in solvents although a solventless system is recommended for economy. The reaction conditions include an anhydrous atmosphere and a temperature of 25° to 350° C., preferably 150° to 320° C. Significant reaction does not take place at temperatures lower than 25° C. Temperatures higher than 350° C.

provide increased reaction rates at which it is difficult to prepare the silazane polymer to the desired degree of polymerization and the polymer would rather become insoluble and infusible.

It is presumed that in reacting organic silicon compounds with a disilazane, two successive stages of reaction take place according to the following reaction schemes A and B.

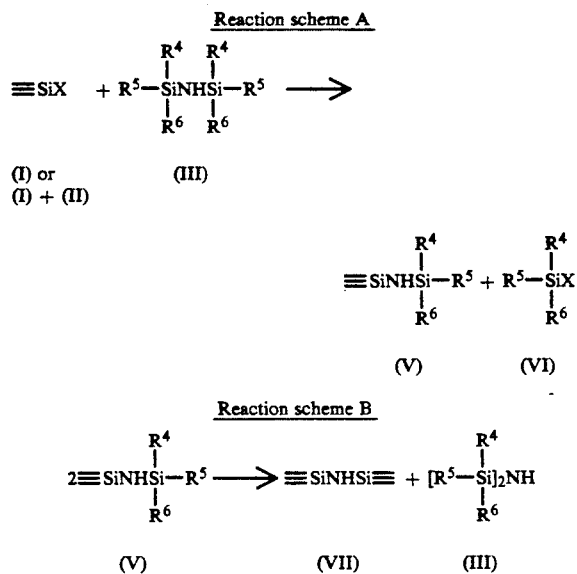

In the first stage, the organic silicon compound of formula (I) or compounds of formulae (I) and (II) react with the disilazane of formula (III) according to scheme A, yielding an intermediate compound of formula (V) and a volatile by-product of formula (VI). The by-product of formula (VI) is driven out of the reaction system by distillation under atmospheric pressure or vacuum with the progress of reaction. Subsequently, while the temperature rises gradually, condensation of the compound of formula (V) starts according to scheme B, yielding the end silazane polymer of formula (VII) having the desired molecular weight. The disilazane of formula (III) which is co. produced along with the silazane polymer of formula (VII) is driven out of the system for reuse by distillation under atmospheric pressure or vacuum like the by-product of formula (VI).

The degree of polymerization and melting point of the silazane polymer may be adjusted by varying the reaction parameters including the blending ratio of organic silicon compounds and reaction temperature and time. The viscosity and melting point of the polymer can be further adjusted by distilling off oligomers having a relatively low molecular weight in vacuum while hot.

The thus produced organic silazane polymer normally contains residual halogen in an amount of 0.05 to 3% by weight. Due to the presence of residual halogen, the polymer can gradually increase its viscosity during long term heating as encountered in preparing fibers by melt spinning, for example. As a result, the polymer or melt can become less spinnable so that frequent breakage might occur during spinning and also, less stable in air, that is, less resistant against hydrolysis. The feature of the present invention is to reduce the residual halogen in the organic silazane polymer. It is desirable to reduce the content of residual halogen in the organic silazane polymer to 0.01% by weight or lower, especially to 50 ppm or lower.

Preferably, the content of residual halogen in the organic silazane polymer is reduced by using ammonia whereby the residual halogen is converted into an ammonium halide such as ammonium chloride, which is removed from the organic silazane polymer as by filtration. Ammonia treatment can be carried out in various methods, for example, by (1) melting the polymer and introducing ammonia into the polymer melt under pressure, (2) dissolving the polymer in an organic solvent and introducing ammonia into the solution under pressure, and (3) dissolving the polymer in an organic solvent and introducing ammonia into the solution under atmospheric pressure.

Method (1) favors to maintain the organic silazane polymer at a temperature of 25° to 200° C. and to feed ammonia under a pressure of 2 to 5 atm. Method (2) favors an ammonia supply pressure of 2 to 5 atm. The organic solvents which can be used in methods (2) and (3) include benzene, toluene, xylene, n-hexane, diethyl ether, tetrahydrofuran, and dioxane, to name a few. The solvent is used in such amounts that the polymer concentration may range from 10 to 90% by weight, preferably from 20 to 50% by weight. Ammonia is added to the polymer in either liquid or gas form. The amount of ammonia added to the polymer should preferably be at least 2 times on molar basis relative to the content of residual halogen, typically chlorine in the polymer. For minimizing the residual halogen, ammonia is preferably added to the polymer in an amount of 2 to 10 times on molar basis relative to the content of residual halogen in the polymer. The temperature for ammonia treatment may range from 20° C. to 150° C. although room temperature to 40° C. are preferred for economy. The time normally ranges from 10 to 120 minutes, preferably from 20 to 60 minutes. After the polymer is treated with ammonia in this way, the ammonium halide, typically ammonium chloride resulting from reaction with ammonia is removed from the silazane polymer melt or solution by appropriate means such as filtration and the organic solvent is stripped off, if necessary. Stripping is preferably carried out at about 250° C. and 10 Torr for complete removal of the solvent.

The organic silazane polymers having a residual halogen content reduced in this way are then preferably shaped into an appropriate form as a ceramic precursor, most often into fiber or sheet form by taking advantage of their susceptibility to molding and processing. Alternatively, the organic silazane polymers may be used as binders and adhesives.

According to the present invention, ceramics are manufactured from the organic silazane polymers which have been stabilized by reducing the residual halogen content, by a method involving melting, shaping, infusibilizing and firing steps.

For example, ceramic fibers may be manufactured from the organic silazane polymer by melting the polymer and spinning the melt into green filaments or fibers by any conventional well.known method. The spinning temperature is preferably in the range of from 100° to 300° C. although it varies with the melting point of the polymer.

The green filaments or fibers melt spun from the polymer are then fired into inorganic form at high temperatures. For conversion into sintered inorganic form with the filament shape maintained, the filaments should be made infusible before firing.

For infusibilization, air heating is generally employed. In the practice of the invention, fibers of the organic silazane polymer are preferably made infusible by heating in air at a temperature of 50° to 250° C.. Temperatures of lower than 50° C. are insufficient to render the fibers infusible. Infusibilizing temperatures of higher than 250° C. can cause the polymer to melt again or excess oxygen to incorporate into the fibers so that the fibers lose strength.

Further, the infusibilizing method disclosed in U.S. Ser. No. 07/371,716 or EP Application 0 361 181 is also useful. Preferably, fibers are made infusible by treating them with a gas containing at least one vapor selected from silicon compounds of the general formula (VIII) shown below and then with humid air or ammonia-containing gas. More particularly, the as-spun filaments or fibers are subjected to a first infusibilizing step using an infusibilizing agent in the form of a silicon compound of formula (VIII), that is, the fibers are treated with a gas containing the silicon compound vapor. Then in a second step, the fibers are treated with humid air or ammonia-containing gas.

The infusibilizing agent used is a silicon compound of the following formula:

$$R'_a SiZ_{4-a} \quad \text{(VIII)}$$

wherein R' is a hydrogen atom, lower alkyl group, alkenyl group or aryl group, Z is a chlorine atom, bromine atom or iodine atom, and letter a is a number of 0 to 2, with the proviso that R' groups may be the same or different when a is equal to 2. Examples of the silicon compound of formula (VIII) include $CH_3SiCl_3$, $(CH_3)_2SiCl_2$, $(C_2H_5)SiCl_3$, $(C_2H_5)SiHCl_2$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, and $(CH_2=CH)C_6H_5SiCl_2$. They may be used alone or in admixture of two or more. The preferred infusibilizing agents are $HSiCl_3$ and $SiCl_4$.

The fibers may be treated with a gas containing the infusibilizing agent in any desired manner. For example, an inert gas such as nitrogen ($N_2$) and argon (Ar) may be used as a carrier gas. The carrier gas is passed into the infusibilizing agent and then to a region where the fibers are placed whereupon the fibers are contacted with the carrier gas having the vapor of the agent carried thereon. The concentration of the infusibilizing agent in the gas may be controlled to a desired level by adjusting the tempera ture of the infusibilizing agent source so as to give an appropriate vapor pressure. If the concentration of the agent in the gas is too high, the gas may be diluted with an inert gas. In general, the concentration of infusibilizing agent vapor is preferably controlled to 0.001 to 0.1 mol of the agent per liter of the carrier gas. The treating temperature and time vary with a particular type of organic silazane polymer used. Usually, the treating temperature is a sufficiently low temperature to maintain the polymer infusible, that is, a temperature sufficiently lower than the melting point of the polymer. The treating time is a sufficient time to render the fibers substantially infusible, preferably about 5 to about 240 minutes.

At the end of the first infusibilizing step, the polymer fibers become insoluble in commonly used solvents, for example, benzene, hexane, toluene, and tetrahydrofuran (THF). However, the polymer fibers resulting from only the first infusibilizing step is not fully infusible and will melt during subsequent pyrolysis.

Therefore, the second step of treating with humid air or an ammonia-containing gas is essential to enhance the infusibility of polymer fibers. The manner of treatment in the second step is not particularly limited. In the case of treatment with humid air, for example, the fibers resulting from the first infusibilizing step may be simply exposed in air for a predetermined time to render the fibers completely infusible. The air exposure is simple, but somewhat difficult to consistently yield ceramic fibers having high strength and modulus because the humidity in air is not always constant. Due to varying humidity, subsequent pyrolysis will result in fibers having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the fibers for a sufficient time to complete infusibilization. Usually, the treating temperature is sufficiently lower than the melting point of the polymer. The treating time is a sufficient time to complete infusibilization, preferably about 5 to about 240 minutes. The temperature of water into which air or inert gas is bubbled at the predetermined rate may preferably vary over the range of 0° to 100° C., more preferably 0° to 70° C., most preferably 0° to 30° C.

In the case of ammonia gas treatment, infusibilizing may be completed by exposing the fibers resulting from the first infusibilizing step to ammonia gas or ammonia gas diluted with an inert gas. In the second step, the ammonia gas concentration preferably ranges from 0.01 to 100% by volume, more preferably from 0.2 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the fibers for a sufficient time to complete infusibilization. The treating temperature and time are approximately the same as described for the humid air treatment.

The shaped articles or fibers of the polymer thus made infusible are then fired at elevated temperatures for pyrolysis with or without tension applied thereto, yielding ceramic articles or fibers of Si-C-N system having improved strength, modulus of elasticity, heat resistance and oxidation resistance.

Firing is preferably carried out in vacuum or in an atmosphere of an inert gas such as argon, nitrogen ($N_2$), hydrogen ($H_2$) or ammonia ($NH_3$) gas or a mixture thereof at a temperature of about 700° to about 2000° C., more preferably about 700° to about 1500° C. Most often the infusible fibers are fired under tension. Under such preferred conditions, there are produced ceramic fibers of quality as typified by a tensile strength of 200 to 300 kg/mm² and a modulus of elasticity of 14 to 25 t/mm².

In another embodiment, the organic silazane polymers are added as a binder to powder ceramic raw materials such as alumina, silicon carbide, silicon nitride, and boron nitride and mixtures thereof prior to firing. Ceramic articles of quality can be readily molded from a mixture of the organic silazane polymer and the raw ceramic powder. Most often, 2 to 10 parts, especially 3 to 5 parts by weight of the organic silazane polymer is added to 100 parts by weight of the raw ceramic powder. Articles molded from the mixture of organic silazane polymer and raw ceramic powder need not be infusibilized prior to firing if direct firing does not impair the article shape.

There has been described a method for preparing an organic silazane polymer in a commercially advantageous manner in which the organic silazane polymer is highly resistant against hydrolysis and thermally stable because of the minimized content of residual halogen, while it is well moldable and workable and has a good compromise of strength and flexibility for ease of handling and high ceramic yields so that it is useful as a ceramic fiber precursor.

In the method for manufacturing ceramic materials according to the present invention, the organic silazane polymers can be shaped into articles of the desired form, for example, fiber and sheet form and then fired into quality ceramic articles of Si-C-N or Si-C-N-O system having high strength, modulus of elasticity, heat resistance and oxidation resistance in high yields.

EXAMPLE

Examples of the present invention are given below by way of illustration and not by way of limitation.

EXAMPLE 1

Polymerization Step

A dry four-necked 500-ml flask equipped with a stirrer, thermometer, gas inlet tube, dropping funnel and distillation assembly was charged with 128 grams (0.5 mol) of 1,2-bis(methyldichlorosilyl)ethane, and 322 grams (2 mol) of $[(CH_3)_3Si]_2NH$ was added dropwise to the flask through the dropping funnel. The mixture was slowly heated in a nitrogen atmosphere. When the temperature reached 90° C., reflux started generating vapor at a temperature of 58° C. The resulting volatile components (which were trimethyl chlorosilane and hexamethyldisilazane) were distilled out of the reaction system while the reaction temperature was slowly raised to 280° C. The reaction mixture was maintained at the temperature for 2½ hours. The reaction mixture was cooled down to room temperature, yielding 83.2 grams of a silazane polymer in the form of a glassy white solid. The residual chlorine in the polymer was 1.2% by weight as measured by potentiometric titration.

The polymer was divided into two portions, one portion weighing 42 grams being used in Comparative Example to be described later. The other portion weighing 41.2 grams was dissolved in 200 grams of hexane, to which ammonia gas was introduced at room temperature and a rate of 0.1 liter/min. for 10 minutes. At the end of ammonia gas blowing, the reaction solution became somewhat white turbid due to the presence of ammonium chloride resulting from reaction of ammonia with residual chlorine in the polymer. The salt was removed by filtration. The hexane solvent and low volatile components were removed by stripping at 250° C. and 10 Torr, yielding 38 grams of the silazane polymer in the form of a white glassy solid. This polymer had a molecular weight of 230 g/mol as measured by benzene molar cryoscopy, a melting point of 123° C., and a residual chlorine content of lower than 50 ppm as measured by potentiometric titration. In the IR spectrum, absorption peaks appeared at 3400 cm$^{-1}$ for NH, 2980 cm$^1$ for CH, and 1260 cm$^{-1}$ for SiCH$_3$.

Fiber Forming Step

A mono-hole spinning machine having an orifice of 0.25 mm in diameter was charged with 50 grams of the resulting silazane polymer. A green filament was spun from the polymer melt at a temperature of 155° C. and a take.up speed of 300 m/min. Spinning could be continued over 4 hours without breakage. To evaluate hydrolysis resistance, the green filament was exposed to air at the temperature and relative humidity (RH) shown in Table 1. Then 1 gram of filament pieces was placed in an alumina boat and fired at 1200° C. for 30 minutes in a nitrogen stream. The resulting ceramic fiber sample was measured for oxygen content by means of an N and O analyzer model EMGA-550 manufactured by Horiba Mfg. K.K. The results are shown in Table 1 together with the oxygen content of a ceramic fiber sample which was similarly fired without exposure to humid air.

TABLE 1

| Humid air exposure | | | Oxygen content after firing (wt %) |
|---|---|---|---|
| Temp. (°C.) | Time (day) | RH (%) | |
| — | — | — | 1.0* |
| 20 | 1 | 50 | 1.11 |
| | | 80 | 1.10 |
| 20 | 4 | 50 | 1.12 |
| | | 80 | 1.15 |
| 20 | 7 | 50 | 1.13 |
| | | 80 | 1.20 |
| 30 | 1 | 50 | 1.15 |
| | | 80 | 1.00 |
| 30 | 4 | 50 | 1.10 |
| | | 80 | 1.10 |
| 30 | 7 | 50 | 1.25 |
| | | 80 | 1.30 |

*no exposure to air

As seen from Table 1, the polymer which had been treated with ammonia was little susceptible to hydrolysis and thus stable under the above-reported conditions.

EXAMPLE 2

A green filament was spun from a melt of the polymer obtained in Example 1 through a mono-hole spinning machine in a similar manner as in Example 1. The filament pieces were divided into two groups, one group being exposed to air at 20° C. and RH 50% for 7 days and the other group being not exposed to air. The filament pieces of the two groups were suspended in a mullite tubular furnace having a diameter of 50 mm and a length of 1 m. After the furnace was heated to 40° C., the filaments were rendered infusible by passing trichlorosilane gas in N$_2$ gas at a silane gas concentration of 0.7% by volume for 30 minutes, and then passing ammonia gas at a concentration of 6% by volume for 30 minutes. The furnace was purged with nitrogen gas and then heated at a rate of 150° C./hour whereupon the filaments were fired at 1200° C. for 30 minutes in a nitrogen stream. There were obtained black lustrous fibers.

The ceramic fibers of the two groups were measured for physical properties as reported in Table 2.

TABLE 2

| Exposure to air | 20° C./RH 50%/7 days | No exposure |
|---|---|---|
| Fiber diameter, μm | 12.5 | 12.5 |
| Tensile strength, kg/mm$^2$ | 275 | 278 |
| Modulus of elasticity, t/mm$^2$ | 19.0 | 18.8 |

TABLE 2-continued

| Exposure to air | 20° C./RH 50%/7 days | No exposure |
|---|---|---|
| Ceramic yield, wt % | 73 | 73 |
| Ceramic's oxygen content, % | 0.98 | 1.02 |

As is evident from Table 2, no substantial difference was recognized between the two groups with respect to the oxygen content in ceramic fibers, tensile strength, modulus of elasticity, and ceramic yields. The polymer was little susceptible to hydrolysis and thus stable under the above. reported conditions.

EXAMPLE 3

The procedure of Example 1 was repeated except that the reactants were 64 grams (0.25 mol) of 1,2-bis(-methyldichlorosilyl)ethane, 7.3 grams (0.25 mol) of methyltrichlorosilane, and 310 grams (1.925 mol) of $[(CH_3)_3Si]_2NH$ and they were reacted at 300° C. for two hours. There was obtained 60 grams of a polymer, which had a residual chlorine content of 0.5% by weight as measured by potentiometric titration.

The polymer was dissolved in 250 grams of hexane, to which 100% by volume of ammonia gas was blown at room temperature and a rate of 0.1 liter/min. for the time reported in Table 3. Subsequent filtration and stripping at 250° C. and 10 Torr yielded a silazane polymer, which as measured for residual chlorine by potentiometric titration. The results are shown in Table 3.

TABLE 3

| | Residual Cl in copolymer (wt %) |
|---|---|
| Before treatment | 0.5 |
| Ammonia treating time: | |
| 10 min. | 0.20 |
| 20 min. | 0.01 |
| 40 min. | <0.005 |
| 60 min. | <0.005 |
| 90 min. | <0.005 |

As seen from Table 3, the residual chlorine can be reduced to 0.01% by weight or lower by treating the polymer with ammonia for 20 minutes or longer.

COMPARATIVE EXAMPLE

The polyemr used was the 42-g portion separated from the polymer obtained in Example 1 prior to ammonia treatment (molecular weight 2230 g/mol, m.p. 12° C., residual Cl 1.2 wt %). Using teh same spinning machine as in Example 1, a green filament was spun from the polymer melt at a temperature of 145° C. and a take-up speed of 300 m/min. Spinning could be done satisfactorily for the initial 1 to 2 hours, but breakage often occurred at about 4 hours of spinning. Spinning was interrupted after the lapse of 4½ hours. The spinning barrel was cooled down, the polymer was analyzed to find a molecular weight of 2650 and a melting point of 137° C., suggesting that the polymer increased both the molecular weight and melting point.

The filament obtained was processed as in Example 1. That is, the green filament was exposed to air at the temperature and relative humidity (RH) shown in Table 4. Then the filament was fired at 1200° C. for 30 minutes in a nitrogen stream. The resulting ceramic fiber sample was measured for oxygen content to evaluate hydrolysis resistance. The results are shown in Table 4.

TABLE 4

| Humid air exposure | | | Oxygen content after firing (wt %) |
|---|---|---|---|
| Temp. (°C.) | Time (day) | RH (%) | |
| — | — | — | 0.96* |
| 20 | 1 | 50 | 1.78 |
| | | 80 | 3.20 |
| 20 | 4 | 50 | 15.70 |
| | | 80 | 20.30 |
| 20 | 7 | 50 | 20.50 |
| | | 80 | 23.40 |

*no exposure to air

As seen from Table 4, the polymer which contained 1.2% of residual chlorine underwent hydrolysis upon exposure to air for one day as indicated by an increase of oxygen content in the fired ceramic fiber. After the polymer was allowed to stand in air for 4 days, it underwent significant hydrolysis, developing a rapid rise of oxygen content.

The green filament spun from a melt of the same polymer as above (no ammonia treatment) was exposed to air at 20° C. and RH 50% for 3 days, suspended in a mullite tubular furnace having a diameter of 50 mm and a length of 1 m. After the furnace was heated to 40° C., the filametn was rendered infusible by passing trichlorosilane gas in $N_2$ gas at a silaen gas concentration of 0.7% by volume for 30 minutes, and then passing ammonia gas at a concentration of 6% by volume for 30 minutes. The filament was fired at 1200° C. for 30 minutes in a nitrogen stream. The resulting fiber having a diameter of 13 μm showed poor physical properties as evidenced by a tensile strength of 115 kg/mm² and a modulus of elasticity of 8 t/mm². The fiber had an oxygen-content of 15.5% by weight, indicating that hydrolysis proceeded during the 3-day air exposure so that much oxygen was introduced into the fiber.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for manufacturing a ceramic material comprising the steps of:

reacting an organic silicon compound of formula (I):

wherein R is selected from the class consisting of hydrogen, chloro, bromo, methyl, ethyl, phenyl, and vinyl, $R^1$ is hydrogen or methyl, and X is chloro or bromo, or a mixture of an organic silicon compound of formula (I) and an organic silicon compound of formula (II):

wherein $R^2$ and $R^3$ are independently selected from the class consisting of hydrogen, chloro, bromo, methyl, ethyl, phenyl, and vinyl, and X is chloro or bromo, with a disilazane of formula (III):

wherein $R^4$, $R^5$ and $R^6$ are independently selected from the class consisting of hydrogen, methyl, ethyl, phenyl, and vinyl, at a temperature of 25° to 350° C. in an anhydrous atmosphere; and reacting the resulting organic silazane polymer having residual halogen in an amount of 0.05 to 3% by weight with ammonia added to the polymer in an amount of 2 to 10 times on molar basis relative to the content of residual halogen in the polymer, thereby reducing the residual halogen in the polymer to 0.01% by weight or lower;

melting the resulting organic silazane polymer having a reduced content of the residual halogen to form a desired shape;

infusibilizing the formed article; and firing the article into inorganic form.

* * * * *